United States Patent Office 3,419,561
Patented Dec. 31, 1968

3,419,561
2,3,4,4a,5,6,10b-HEPTAHYDRO-1-OXAPHENAN-
THRIDINES AND PRODUCTION THEREOF
Herndon Jenkins, Richmond, Va., assignor to A. H.
Robins Company Incorporated, Richmond, Va.,
a corporation of Virginia
No Drawing. Filed Oct. 23, 1965, Ser. No. 504,136
11 Claims. (Cl. 260—286)

ABSTRACT OF THE DISCLOSURE 2,3,4,4a,5,6,10b - heptahydro-1-oxaphenanthridines and non-toxic pharmaceutically acceptable acid addition salts thereof, optionally containing substituents in the 2, 5, and 9 positions, useful as sedatives, and production thereof by ring-closure of corresponding 2-phenyl tetrahydropyran-3-amines with formaldehyde and hydrochloric acid.

The present invention relates to certain novel heterocyclic compounds, and is more particularly concerned with such compounds having three rings.

The invention is especially concerned with novel compounds having the formula:

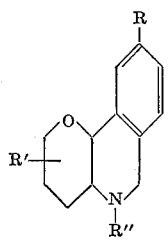

(I)

wherein R is selected from the group consisting of lower-alkoxy and hydroxy, and
wherein R' is selected from the group consisting of hydrogen and lower-alkyl, and
R" is selected from the group consisting of hydrogen, lower-alkyl, lower-cycloalkyl, phenyl, and phenyl-lower-alkyl, and acid addition and quaternary ammonium salts thereof.

The compounds of the invention constitute a new class of compounds which exhibit pharmacological activities characteristic of sedatives and are accordingly useful as such.

It is accordingly an object of the present invention to provide new and useful three-ring heterocyclic compounds, compositions thereof, and methods of making and using the same. Other objects of the invention will be apparent to one skilled in the art.

The following illustrates the method of the preparation of the compounds according to the present invention.

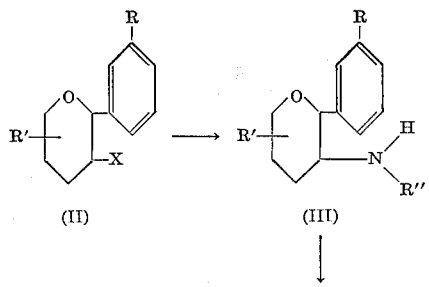

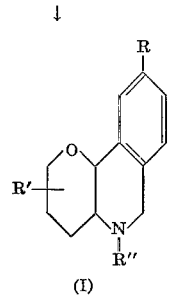

(I)

wherein X is a halogen, preferably bromine or chlorine,
wherein R is selected from the group consisting of lower-alkoxy and hydroxy,
wherein R' is selected from the group consisting of hydrogen and lower-alkyl, and
wherein R" is selected from the group consisting of hydrogen, lower-alkyl, lower-cycloalkyl, phenyl, and phenyl-lower-alkyl.

A 2-(3-substituted-phenyl)-3-bromo (or chloro) tetrahydropyran (II) (1 mole) is treated with an excess of the appropriate primary or secondary amine or ammonia (2 to 10 moles; ca. 5 moles preferred) either without solvent or in a solvent which dissolves the reactants but does not itself enter the reaction (e.g., lower alcohols such as 2-propanol, aromatics such as toluene, ethers such as ethylene glycol dimethyl ether or other suitable solvents; 2-propanol being especially useful). The reaction mixture is heated from 5 to 100 hours at elevated temperatures, preferably in the range of 110° to 190° centigrade (24 hours at 150° centigrade being typical). The product III formed in this reaction may be isolated in any manner suitable for organic bases. For example, the basic product may be taken up in acid, neutral material separated therefrom by extraction of the aqueous solution with an organic solvent (e.g., ether, ethyl acetate or toluene) and the basic product liberated from the acid solution by making the solution strongly basic. The basic product (III) thus liberated may be taken up in an organic solvent (e.g., ether, chloroform, ethyl acetate or toluene), dried over an anhydrous salt which will form a hydrate (e.g., sodium sulfate, potassium carbonate or calcium sulfate), concentrated, and distilled in vacuo. The amines may be separated into optical isomers through separation of their diastereoisomeric salts formed with optically active acids (e.g., d-tartaric, l-malic acids, etc.).

The product (III) thus formed, either in the form of the free base or an acid addition salt thereof, is then reacted with formaldehyde and hydrochloric acid to form the product of the invention (I).

In order for ring closure to take place, there must be a meta-substitution present on the phenyl ring of such nature as to activate the position para thereto. Among such para position activating groups are hydroxy and lower-alkoxy, e.g., methoxy, ethoxy, or the like.

In the definition of symbols in the foregoing Formulas I, II and III and where they appear elsewhere throughout the specification and claims, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower-alkoxy" has the formula —O-lower-alkyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. Included in the term "phenyllower-alkyl" are groups such as benzyl, phenethyl, methylbenzyl, phenpropyl, and the like.

The compounds of Formula I or III may be converted to and are most conveniently employed in the form of non-toxic pharmaceutical acceptable acid addition or quaternary ammonium salts. Such salts also have improved water-solubility. Although the non-toxic salts are preferred, any salt may be prepared for use as a chemical intermediate, as in the preparation of another but non-toxic acid addition salt. The free basic compounds of Formula I may alternatively, conveniently be converted to their quaternary ammonium or acid addition salts by reaction of the free base with the selected acid or acid ester, e.g., an alkyl, cycloalkyl, alkenyl, cycloalkenyl or aralkyl halide, sulfate or sulfonate, preferably in the presence of an organic sovent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The quaternary ammonium salts are obtained, e.g., by the addition of alkyl, cycloalkyl, alkenyl, cycloalkenyl, or aralkyl esters of inorganic acids or organic sulfonic acids, to the free base form of the selected tertiary amino compound. The alkyl, cycloalkyl, alkenyl, cycloalkenyl, or aralkyl esters so used include such compounds as methyl chloride, methyl bromide, methyl iodide, ethyl bromide, propyl chloride, allyl chloride, allyl bromide, dimethyl sulfate, methyl-benzene-sulfonate, methyl p-toluene sulfonate, benzyl halides such as p-chlorobenzyl chloride and p-nitrobenzyl chloride, and the like.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

The following preparations are given by way of illustration only and are not to be construed as limiting.

Preparation 1.—3-bromo-2-(3-methoxyphenyl)tetrahydropyran

Bromine (430 g., 2.69 moles) was added dropwise to a solution of dihydropyran (227 g., 2.69 moles) in absolute ethyl ether (250 ml.) at about −20° C. with vigorous stirring. This solution was added slowly with stirring to a solution of 3-methoxyphenylmagnesium bromide (3.00 moles) in absolute ethyl ether (1 liter) at about 20–25° C. The reaction mixture was refluxed for one hour after the addition was completed and cautiously mixed with water (1 liter). The water layer was discarded and the ether layer washed with water, dried over sodium sulfate, concentrated and distilled. A yield of 59% of the theoretical amount of 3-bromo-2-(3-methoxyphenyl)tetrahydropyran. The product boiled at 116–120° C. at 0.2 mm. pressure; $n^{24}_D$ 1.5632.

Preparation 2.—2-(3-methoxyphenyl)tetrahydropyran-3-amine hydrochloride 3-bromo-2-(3-methoxyphenyl) tetrahydropyran (0.20 mole) in sufficient 2-propanol (210 ml.) to make a solution was saturated with ammonia at 0–10° C. and this mixture was stirred and heated for 48 hours in a closed stainless steel autoclave at about 145° C. The contents of the autoclave were then concentrated at reduced pressure to a pasty mass and partitioned between isopropyl ether and sufficient 2 N hydrochloric acid to produce a strongly acidic aqueous layer. The isopropyl ether layer was discarded and the aqueous layer was made strongly basic with 50% aqueous sodium hydroxide. An oil separated and was taken up in chloroform, washed with water, dried over sodium sulfate, concentrated and distilled. The product, 2-(3-methoxyphenyl)tetrahydropyran-3-amine was obtained in 44% yield, boiling at 133–136° C. at 0.22 mm. pressure; $n^{25}_D$ 1.5513. The 2-(3-methoxyphenyl)tetrahydropyran-3-amine was treated with an excess of an ether solution of hydrogen chloride to give a crystalline hydrochloride salt. The 2-(3-methoxyphenyl)tetrahydropyran - 3 - amine hydrochloride thus obtained was recrystallized from a mixture of 2-propanol and ligroin giving white crystals melting at 183–184° C.

Analysis.—Calculated for $C_{12}H_{18}ClNO_2$: C, 59.13; H, 7.44; N, 5.75. Found: C, 59.14; H, 7.52; N, 5.66.

Utilizing the method of Preparation 2, the following compounds were prepared from the stated ingredients:

2 - (3 - hydroxyphenyl)tetrahydropyran - 3 - amine hydrochloride from 3 - bromo - 2 - (3 - hydroxyphenyl)tetrahydropyran and ammonia.

N - methyl - 2 - (3 - methoxyphenyl)tetrahydropyran-3 - amine hydrochloride from 3 - bromo - 2 - phenyltetrahydropyran and methylamine.

N - cyclohexyl - 2 - (3 - methoxyphenyl)tetrahydropyran - 3 - amine hydrochloride from 3 - bromo - 2 - phenyltetrahydropyran and cyclohexylamine.

N - phenyl - 2 - (3 - methoxyphenyl)tetrahydropyran-3 - amine hydrochloride from 3 - bromo - phenyltetrahydropyran and aniline.

N - phenylethyl - 2 - (3 - methoxyphenyl)tetrahydropyran - 3 - amine hydrochloride from 3 - bromo - 2 - phenyltetrahydropyran and phenylethylamine.

The following examples are given by way of illustration only and are not to be construed as limiting.

Example 1.—9-methoxy-2,3,4,4a,5,6,10b-heptahydro-1-oxaphenanthridine hydrochloride To 2 - (3 - methoxyphenyl)tetrahydropyran - 3 - amine (0.20 mole) at 20° C. was added formaldehyde (0.21 mole, as a 37% aqueous solution) dropwise over 15 minutes. The resulting mixture was heated at 90–100° C. for 30 minutes and then treated dropwise with concentrated hydrochloric acid (0.21 mole). This mixture was heated 2 hours at 90 to 100° C. The reaction mixture was cooled and the crystalline product was filtered off. Yield: 79% of the theoretical quantity of 9-methoxy-2,3,4,4a,5,6,10b-heptahydro-1-oxaphenanthridine hydrochloride. The analytical sample melted at 274.5–276.5° C. after recrystallization from 2-propanol.

Analysis.—Calc. for $C_{13}H_{18}NO_2Cl$: C, 61.05; H, 7.09; N, 5.48. Found: C, 61.08; H, 7.19; N, 5.77.

Example 2.—5-methyl-9-methoxy-2,3,4,4a,6,10b-heptahydro-1-oxaphenanthridine hydrochloride N - methyl - 2 - (3 - methoxyphenyl)tetrahydropyran-3-amine (0.086 mole) was treated dropwise over 15 minutes at 20° C. with aqueous formaldehyde (0.086). The mixture was heated ten minutes at 90–100° C. and then treated with hydrochloric acid (0.20 mole). The resulting mixture was heated three hours at 90–100° C. and then partitioned between ether and dilute base. The ether solution was dried and distilled giving a 91% yield of 5-methyl - 9 - methoxy - 2,3,4,4a,6,10b - heptahydro - 1 - oxaphenanthridine distilling at 120–129° C. at 0.15 mm.

The hydrochloride salt was prepared and recrystallized from ethanol-ethyl ether. Melting point 201.5–203° C.

*Analysis.*—Calc. for $C_{14}H_{20}NO_2Cl$: C, 62.33; H, 7.47; N, 5.19. Found: C, 62.24; H, 7.60; N, 5.09.

Utilizing the method of Example 1, the following compounds are prepared from the stated ingredients:

9 - hydroxy - 2,3,4,4a,6,10b - heptahydro - 1 - oxaphenanthridine hydrochloride from 2 - (3 - hydroxyphenyl)tetrahydropyran-3-amine or an acid addition salt thereof, e.g., the hydrochloride, and formaldehyde and hydrochloric acid.

5 - cyclohexyl - 9 - methoxy - 2,3,4,4a,6,10b - heptahydro - 1 - oxaphenanthridine hydrochloride from N - cyclohexyl - 2 - (3 - methoxyphenyl)tetrahydropyran - 3 - amine or an acid addition salt thereof, e.g., the hydrochloride, and formaldehyde and hydrochloric acid.

5 - phenyl - 9 - methoxy - 2,3,4,4a,6,10b - heptahydro - 1 - oxaphenanthridine hydrochloride from N - phenyl - 2 - (3 - methoxyphenyl)tetrahydropyran - 3 - amine or an acid addition salt thereof, e.g., the hydrochloride, and formaldehyde and hydrochloric acid.

5 - (2 - phenylethyl) - 9 - methoxy - 2,3,4,4a,6,10b-heptahydro - 1 - oxaphenanthridine hydrochloride from N - phenylethyl - 2 - (3 - methoxyphenyl)tetrahydropyran-3-amine or an acid addition salt thereof, e.g., the hydrochloride, and formaldehyde and hydrochloric acid.

The compounds may be administered for therapeutic purposes according to usual modes of administration and in usual forms; such as solutions, emulsions, suspensions, pills, tablets, and capsules, alone or together with a pharmaceutically acceptable carrier therefor, such as starch, lactose, saccharose, sorbitol, gums, and the like, and in dosages ranging from one to 500 milligrams, preferably five to fifty or 100 milligrams.

Various modifications and equivalents will be apparent to one skilled in the art and may be made in the compounds, methods, and procedures of the present invention without departing from the spirit or scope thereof, and it is therefore to be understood that the invention is to be limited only by the scope of the appended claims.

I claim:

1. A compound selected from (1) compounds of the formula:

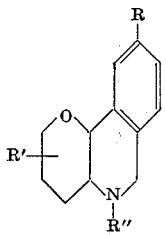

wherein R is selected from the group consisting of lower-alkoxy and hydroxy,
wherein R' is selected from the group consisting of hydrogen and lower-alkyl, and
wherein R'' is selected from the group consisting of hydrogen, lower-alkyl, lower-cycloalkyl, phenyl, and phenyllower-alkyl, and
(2) non-toxic pharmaceutically acceptable acid addition and quaternary ammonium salts thereof.

2. 9 - methoxy - 2,3,4,4a,5,6,10b - heptahydro - 1-oxaphenanthridine non-toxic pharmaceutically acceptable acid addition salts.

3. 5-methyl-9-methoxy - 2,3,4,4a,6,10b - heptahydro-1-oxaphenanthridine non-toxic pharmaceutically acceptable acid addition salts.

4. 9-hydroxy-2,3,4,4a,6,10b - heptahydro-1-oxaphenanthridine non-toxic pharmaceutically acceptable acid addition salts.

5. 5 - cyclohexyl - 9 - methoxy - 2,3,4,4a,6,10b-heptahydro-1-oxaphenanthridine non-toxic pharmaceutically acceptable acid addition salts.

6. 5 - pheny - 9 - methoxy - 2,3,4,4a,6,10b-heptahydro-1-oxaphenanthridine non-toxic pharmaceutically acceptable acid addition salts.

7. 5 - (2 - phenylethyl) - 9 - methoxy-2,3,4,4a,6,10b-heptahydro-1-oxaphenanathridine non-toxic pharmaceutically acceptable acid addition salts.

8. A method for the producton of a compound selected from the group consisting of (1) compounds having the formula:

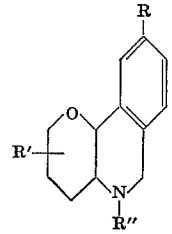

wherein R is selected from the group consisting of lower-alkoxy and hydroxy,
wherein R' is selected from the group consisting of hydrogen and lower-alkyl, and
wherein R'' is selected from the group consisting of hydrogen, lower-alkyl, lower-cycloalkyl, phenyl, and phenyllower-alkyl, and
(2) acid addition and quaternary ammonium salts thereof, which comprises mixing and reacting together (A) reactant selected from (a) a compound having the formula:

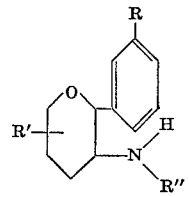

(III)

wherein R, R', and R'' have the values previously assigned,
and (b) an acid addition salt thereof, with (B) formaldehyde and hydrochloric acid.

9. The process of claim 8 wherein the compound of Formula III is selected from the group consisting of a 2-(3-methoxyphenyl)tetrahydropyran-3-amine acid addition salt, a N-methyl-2-(3-methoxyphenyl)tetrahydropyran-3-amine acid addition salt, a 2-(3-hydroxyphenyl)tetrahydropyran-3-amine acid addition salt, a N-cyclohexyl-2-(3-methoxyphenyl)tetrahydropyran-3-amine acid addition salt, a N-phenyl-2-(3-methoxyphenyl)tetrahydropyran-3-amine acid addition salt, and a N-phenylethyl-2-(3-methoxyphenyl)tetrahydropyran-3-amine acid addition salt.

10. 9 - methoxy - 2,3,4,4a,5,6,10b - heptahydro - 1-oxaphenanthridine hydrochloride.

11. 5 - methyl - 9 - methoxy - 2,3,4,4a,6,10b - heptahydro-1-oxaphenanthridine hydrochloride.

References Cited

UNITED STATES PATENTS 3,121,086  2/1964  Sartori _____ 260—286
3,313,818  2/1967  Lesher _____ 260—286 X

OTHER REFERENCES

Burger, "Medicinal Chemistry," 2nd ed., Interscience, 1960, pp. 42–43.

ALEX MAZEL, *Primary Examiner.*

D. G. DAUS, *Assistant Examiner.*

U.S. Cl. X.R.

167—65; 260—289, 345.9